US010982301B2

(12) United States Patent
Chintinne et al.

(10) Patent No.: US 10,982,301 B2
(45) Date of Patent: Apr. 20, 2021

(54) SLAG FROM NON-FERROUS METAL PRODUCTION

(71) Applicant: Metallo Belgium, Beerse (BE)

(72) Inventors: Mathias Chintinne, Wilrijk (BE); Charles Geenen, Overpelt (BE); Dirk Goris, Beerse (BE)

(73) Assignee: METALLO BELGIUM, Beerse (BE)

( * ) Notice: Subject to any disclaimer, the term of this patent is extended or adjusted under 35 U.S.C. 154(b) by 601 days.

(21) Appl. No.: 15/563,446

(22) PCT Filed: Mar. 30, 2016

(86) PCT No.: PCT/EP2016/056916
§ 371 (c)(1),
(2) Date: Sep. 29, 2017

(87) PCT Pub. No.: WO2016/156394
PCT Pub. Date: Jun. 10, 2016

(65) Prior Publication Data
US 2018/0057911 A1 Mar. 1, 2018

(30) Foreign Application Priority Data
Apr. 3, 2015 (EP) .................................. 15248015

(51) Int. Cl.
*C22B 7/04* (2006.01)
*C04B 5/00* (2006.01)
*C22B 4/00* (2006.01)
*C04B 5/06* (2006.01)
*C04B 28/26* (2006.01)
*C04B 28/06* (2006.01)
*B28B 3/02* (2006.01)
*B28B 11/24* (2006.01)
*C04B 14/06* (2006.01)
*C04B 18/14* (2006.01)
*C04B 28/08* (2006.01)
*C22B 15/00* (2006.01)
*C04B 103/54* (2006.01)
*C04B 111/52* (2006.01)
*C04B 111/28* (2006.01)

(52) U.S. Cl.
CPC ................. *C22B 7/04* (2013.01); *B28B 3/02* (2013.01); *B28B 11/243* (2013.01); *C04B 5/00* (2013.01); *C04B 5/06* (2013.01); *C04B 5/065* (2013.01); *C04B 14/06* (2013.01); *C04B 18/141* (2013.01); *C04B 28/06* (2013.01); *C04B 28/08* (2013.01); *C04B 28/26* (2013.01); *C22B 4/005* (2013.01); *C22B 15/0054* (2013.01); *C04B 2103/54* (2013.01); *C04B 2111/28* (2013.01); *C04B 2111/52* (2013.01); *C04B 2201/30* (2013.01); *Y02P 10/20* (2015.11); *Y02W 30/91* (2015.05)

(58) Field of Classification Search
CPC ....... C04B 18/141; C04B 18/144; C04B 5/00; C04B 5/06; C04B 5/065; C04B 14/06; C04B 28/06; C04B 28/08; C22B 7/04; C22B 4/005; C22B 15/0054
USPC .......................................... 75/316, 319, 329
See application file for complete search history.

(56) References Cited

U.S. PATENT DOCUMENTS

| 4,778,523 A | 10/1988 | Tomari et al. |
| 5,749,962 A | 5/1998 | Krofchak |
| 2007/0095169 A1 | 5/2007 | Van Camp et al. |

FOREIGN PATENT DOCUMENTS

| CN | 1878879 A | 12/2006 | |
| JP | 2007506865 A | 3/2007 | |
| JP | 2008031548 A | 2/2008 | |
| JP | 2010236069 A | 10/2010 | |
| JP | 2011063835 A | 3/2011 | |
| JP | 2012067375 A | 4/2012 | |
| KR | 2011113289 A | * 10/2011 | |
| SU | 1717570 A1 | * 3/1992 | ............ E21F 15/005 |

OTHER PUBLICATIONS

Chiarantini, L., et al., "Copper Production at Baratti (Populonia, Southern Tuscany) in the Early Etruscan Period (9th-8th Centuries BC)," Journal of Archaeological Science 36(7):1626-1636, Jul. 2009.

Hecker, E., et al., "Treatment of Lead and Zinc Slags in Hollow Electrode DC-EAF in Consideration of Calculated Phase Equilibria and Thermodynamics," Proceedings of the VII International Conference on Molten Slags, Fluxes and Salts, The South African Institute of Mining and Metallurgy, Johannesburg, South Africa, 2004, pp. 377-384.

Hu, H., et al., "The Recovery of Zn and Pb and the Manufacture of Lightweight Bricks From Zinc Smelting Slag and Clay," Journal of Hazardous Materials 271:220-227, Apr. 2014.

(Continued)

Primary Examiner — Scott R Kastler
(74) Attorney, Agent, or Firm — Christensen O'Connor Johnson Kindness PLLC

(57) ABSTRACT

Disclosed is a slag comprising, on a dry basis and expressed as the total of the metal present as elemental metal and the presence of the metal in an oxidized state, a) at least 7% wt and at most 49% wt of Fe, b) at most 1.3% wt of Cu, c) at least 24% wt and at most 44% wt of $SiO_2$, and d) at least 2.0% wt and at most 20% wt of CaO, characterised in that the slag comprises, on the same basis, e) at least 0.10% wt and at most 1.00% wt of Zn, f) at least 0.10% wt and at most 2.5% wt of MgO, and g) at most 0.100% wt of Pb. Further disclosed are an improved object comprising the slag, a process for the production of the slag, and a number of uses of the slag, whereby the slag may comprise up to at most 1.50% wt of zinc and down to 1.0% wt of CaO.

45 Claims, No Drawings

(56) References Cited

OTHER PUBLICATIONS

International Preliminary Report on Patentability dated Jul. 3, 2017, issued in corresponding International Application No. PCT/EP2016/056916, filed Mar. 30, 2016, 5 pages.

International Search Report dated Jun. 9, 2016, issued in corresponding International Application No. PCT/EP2016/056916, filed Mar. 30, 2016, 5 pages.

Maldonado, B., and T. Rehren, "Early Copper Smelting at Itziparatzico, Mexico," Journal of Archaeological Science 36(9):1998-2006, Sep. 2009.

Mongiatti, A., et al., "Testing Ores for Gold and Silver in Renaissance Austria: New Techniques, New Discoveries," Proceedings of the 36th International Symposium on Archaeometry, May 2-6, 2006, Quebec, 13 pages.

Petkovic, D., et al., "Procena Energetske Efikasnosti Procesa Fjumingovanja Šljake Šahtnog Topljenja Na Osnovu Materijalnog I Toplotnog Bilansa," IMK Istrazivanje I Razvoj 16(37):43-46, Apr. 2010.

Piatajk, N.M., and R.R. Seal II, "Mineralogy and the Release of Trace Elements From Slag From the Hegeler Zinc Smelter, Illinois (USA)," Applied Geochemistry 25(2):302-320, Feb. 2010.

Schoukens, A.F.S., et al., "Plasma-Arc Treatment of Steel-Plant Dust and Zinc-Containing Slag—Theoretical and Practical Considerations," Proceedings of the International Lead and Zinc Study Group Conference, Jun. 11-13, 1991, Rome, 12 pages.

Verscheure, K., et al., "Continuous Fuming of Zinc-Bearing Residues: Part II. The Submerged-Plasma Zinc-Fuming Process," Metallurgical and Materials Transactions B 38(1):21-33, Feb. 2007.

Written Opinion of the International Searching Authority dated Jun. 9, 2016, issued in corresponding International Application No. PCT/EP2016/056916, filed Mar. 30, 2016, 6 pages.

First Chinese Office Action, dated Dec. 3, 2018, issued in Chinese Application No. 201680023625.7, filed Oct. 23, 2017, 13 pages.

Gasik, M.N., et al., "Theory and Process of Ferroalloy Production," Metallurgical Industry Press, Aug. 31, 1994, p. 49 (5 pages including translation of summary).

Wang, Q., "Treatment and Recycling of Industrial Solid Waste," China Environmental Science Press, Dec. 31, 2006, p. 305 (7 pages including translation).

Japanese Office Action dated Dec. 19, 2019, issued in corresponding Japanese Application No. 2018502327, filed Mar. 30, 2016, 2 pages.

Kawahara, M., "Utilization of Non-Ferrous Metallurgical Slags," Shigen-to-Sozai, 1997, 113(2), 995-998.

Niki, T., et al., "Basic properties of concrete with copper slag sand," Proceedings of the Japan Concrete Institute, 1995, 17(1), 8 pages.

Kurisu, K, "Copper slag aggregates for concrete," Lecture of Modern Metallurgy Refining 2 Non-ferrous metal refining, 8 pages.

* cited by examiner

SLAG FROM NON-FERROUS METAL PRODUCTION

FIELD OF THE INVENTION

The present invention relates to the production of non-ferrous metals, such as copper, from primary sources, meaning fresh ore, from secondary feedstocks, also known as recyclable materials, or from combinations thereof. Recyclable materials, may for instance be by-products, waste materials and end-of-life materials. More particularly, the invention relates to an improved slag, as a coproduct from such non-ferrous metal production.

The slag coproduct from copper (Cu) production is particularly special in terms of composition. The operating temperatures of a copper smelter are usually significantly lower than these of certain other smelters. In order for the slag to be sufficiently fluid at the lower temperatures, particular ingredients are wanted or desired because they may have a tendency, sometimes at particular concentration ranges, to suppress the slag melting temperature, and hence to make the process operable without imposing extra high temperatures, which are very demanding in terms of energy consumption, and hence in terms of operating costs.

BACKGROUND OF THE INVENTION

The materials available as feedstock for the production of non-ferrous metals typically contain a plurality of metals. Because of the high purity requirements for the non-ferrous metals in most of their high volume applications, the different metals need to be separated from each other in the production process. The non-ferrous metal production processes typically contain at least one and usually a plurality of pyrometallurgical process steps in which metals and metal oxides both occur in a liquid molten state, and wherein the metal oxides may be separated by gravity as a separate liquid slag phase from the molten metal phase. The slag phase is usually withdrawn as a separate stream from the process, and this separation may lead to the production of a slag as the coproduct from the metal production.

The non-ferrous metals may be produced from fresh ore as the starting material, also called primary sources, or from recycled materials, also known as secondary feedstocks, or from a combination thereof.

The recovery of non-ferrous metals from secondary feedstocks has become an activity of paramount importance over the years. The recycling of non-ferrous metals after use has become a key contributor in the industry, because of the continuing strong demand for such metals and the reducing availability of high quality fresh metal ores. Also the processing of secondary feedstocks typically involves the use of pyrometallurgical process steps, such as smelters, which generate a slag as coproduct.

Slag primarily contains metal oxides, which are liquid at high temperatures. In non-ferrous metal smelters, e.g. copper, lead or zinc smelters, the metal oxides are present in the liquid state and have a lower density than the liquid molten metals. The metal oxides may then be separated from the metals by gravity. The slags are typically cooled and crushed/sized, and may be used in concrete production, as a substitute for rocks and gravel, as an aggregate in road construction, and when ground, thanks to their unusual hardness are also of interest for use as blasting sand or blasting grit.

Some of the substances that may be found in the slag products known in the art are considered potentially harmful to the environment. Primarily lead, but to some extent also zinc, are prime examples of such undesired substances. Zinc and lead are both metals which are usually present in forms which are leachable from the slag, and the presence of significant levels thereof preclude many uses of the slag product, particularly in the economically more attractive applications, and may make the disposal of such slags in landfill much more complex and difficult, typically having to be considered as "hazardous waste". Acceptance of the use in certain applications is often determined by testing the leaching behaviour of slags. Typically, elements such as Pb and Zn are prone to leaching and may cause a particular slag to fail such acceptance tests.

Moreover, the Pb content of a product or composition may impose limits to its use, because lead has caused concerns as a possible reproductive toxin. In some jurisdictions, the classification limits for the corresponding CLP (Classification, Labeling, Packaging) regulation is currently under investigation, targeting the installation of a Specific Classification Limit (SCL) for Pb and Pb-containing compounds. The limit may possibly become set as low as 0.03 wt % Pb. The commercially available slags from non-ferrous metal production have a Pb content which is usually significantly above the even much higher level of 0.3 wt %. Where this CLP regulation will be coming into force, these current slags from non-ferrous metal production will become subject to additional labelling requirements, making the commercialisation and acceptance of these slags in many current applications more difficult, if not impossible, and which may also increase the burden of selected disposal routes such as landfill. In this context, it is pointed out that particular end-uses, such as the use of slag as blasting sand, implies that the waste by-product from the blasting operation, which includes the slag, typically is disposed of as landfill. The lead content of the slag may therefore seriously impair the use of the slag in some of the current valuable end-use applications, such as some forms of sand blasting.

S. Monosi et al, "Non Ferrous Slag as Cementitious Material and Fine Aggregate for Concrete", presented at the $3^{rd}$ CANMET/ACI International Symposium on Sustainable Development of Cement and Concrete, 2001, reported about a slag containing 4.77% wt of Zn and 2.03% of Pb which was tested as an ingredient for concrete, replacing Portland cement and/or natural sand. The slag also contained 14.65% wt of $SiO_2$. Leaching tests showed the release of zinc and lead, but at values which remained under the 1998 Italian legal standard.

The inventors have however found that the presence of zinc in the slag, at the levels which were used in the work of Monosi, slows down significantly the hardening of concrete and other construction compositions such as cements. This effect on the hardening rate represents an impediment for the use of slags containing significant amounts of Zn, as cementitious material and/or as aggregate in concrete or cements.

There therefore remains a need for a slag from non-ferrous metal production which represents a lower risk for leaching of metals, in particular a slag which has a lead content and/or a zinc content which is sufficiently low to not raise any leaching concern, such that the slag may be acceptable for, and upgraded by its use in economically attractive end-use applications.

Additionally, there remains the need for a slag from non-ferrous metal production having a Pb content below 0.03% wt, and which would therefore bring the advantage of being exempt from additional labelling requirements under the potentially upcoming CLP Regulation in certain jurisdictions.

Furthermore, there remains a need for a slag from non-ferrous metal production which does not bring the disadvantage of slowing down the hardening rate of concrete or cement containing such slag as cementitious material or as aggregate.

U.S. Pat. No. 5,749,962 describes the slag byproduct from the production of nickel from nickel ore, the slag being described as "essentially FeO.SiO2", and its use, after grinding, as a binder in a mix with Type 3 high early strength Portland cement to produce a blended cement, e.g. to produce concrete. The slag is free of Zn and Pb because also the ore for the nickel production is free of these substances.

U.S. Pat. No. 4,571,260 discloses a process for recovering the metal values of materials containing tin and/or zinc, in particular from materials comprising lead, by heating and smelting the starting materials in a Kaldo converter together with coke as a reducing agent and a high amount of limestone and iron oxide as flux material, and this in a successive batch process sequence starting with an oxidation step. In at least one subsequent reduction step, zinc and, if present, tin may be fumed off and be recovered from the furnace exhaust gas. The high amount of flux materials is required in order to impart a sluggish consistency to the slag at the selected reduction temperatures, such that the coke may be kept in suspension in the slag under vigorous agitation or stirring, in particular in the later part of the reduction period. The 8 tons of slag remaining as residue in the only example of U.S. Pat. No. 4,571,260 contained 1.5% Pb and 1.0% Zn. This slag still contains amounts of zinc and lead which may be of concern with respect to metal leaching. The final slag in U.S. Pat. No. 4,571,260 is dumped.

E. Hecker, B. Friedrich and J. Böhlke—"Treatment of lead and zinc slabs in hollow electrode DC-EAF in consideration of calculated phase equilibria and thermodynamics", in "VII International Conference on Molten Slags Fluxes and Salts, 2004, The South African Institute of Mining and Metallurgy, pp. 377-384, disclose the treatment of slags from the lead or zinc industry, more particularly slags from the QSL process for the winning of lead and slags from the Imperial Smelting (IS) process for the winning of zinc. The pyrometallurgy processes for winning lead and zinc are known to require higher operating temperatures than the processes for winning copper. The article proposes an improved slag treatment as compared to conventional slag fuming or its variant known as the Ausmelt or Isasmelt process. The authors operated on a pilot scale a DC electric arc furnace (DC-EAF) using a gastight hollow graphite cathode system for charging lignite coke into the slag. Only a low gas flow of nitrogen is used to counteract the capillary forces between the slag and the inner electrode surface. The exhaust gas is thus rich in $CO_2$, the gas which is generated by the metal oxide reduction reaction in exchange of the oxidation of the injected carbon. An amount of tertiary air is introduced, in order to bring sufficient oxygen above the bath for the oxidation of the volatilized Zn in the exhaust gas to ZnO, and for the afterburning of any remaining CO to more $CO_2$. The external heat input of a DC-EAF is the direct heating by the electric arc pulled in the slag bath between the two electrodes. Tables I and II in the publication provide information about the slag compositions before and after the treatment. Where the information after the treatment is missing, the values may be calculated from the enrichment factor of the Fe total concentrations. All the slags are free of any copper values. In addition, the QSL slag after treatment contains 0.11% wt Pb, and may therefore still represent a concern for unacceptable Pb leaching. The IS slag after treatment contains 5.0% wt of MgO. As explained above in this document, the high concentration of MgO brings the drawback that the melting point of the slag is higher, which raises an extra burden in terms of processing temperature, requiring extra investment and energy input.

U.S. Pat. No. 8,088,192 discloses the processing of a cold charged Cu—Fe—Ni slag in an AC electric arc furnace. The starting slag was still as rich as 8% wt in copper and contained 5% wt of MgO. Before the treatment, highly concentrated (97.7% wt) copper is also charged into the furnace. The heating to 1450° C., N2 stirring, the further addition of slag and of free lime, CaO, has then produced a homogeneous slag. A subsequent reduction was performed by injecting fine anthracite. Settling of the phases separated off a slag phase containing 3% MgO. No alkali metal oxides are reported to be present in the slag of U.S. Pat. No. 8,088,192.

K. Koch and D. Janke, "Schlacken in der Metallurgie", ISBN 3-514-00254-1, discloses on page 157 a "dezinked" slag. The slag is the result of a fuming under reducing conditions of a copper containing slag, during which lead and zinc are reduced and volatilized, once out of the reactor oxidized and as dust precipitated. The document is silent about any presence of magnesium oxide in the slag.

JP 2001 040431 A discloses how the mobility of the slag byproduct from copper production may be improved by adding CaO, $SiO_2$ and Fe to the slag. A wide variety of slags were considered as starting materials, as disclosed in Table 1, all being rich in ZnO, at least 2.4% wt, which corresponds to 1.9% wt Zn, and copper, at least 6.8% wt expressed as $Cu_2O$, which corresponds to at least 6.04% wt of copper. Selected slags from Table 1 were subjected to an additional reduction step by adding iron and optionally air, in order to reduce their $Cu_2O$ content and to recover more copper. This step resulted in the slag compositions disclosed in Table 2, which contained significantly more FeO and of which the $SiO_2$ content had been diluted to at most 20.8% wt $SiO_2$. In the single working example of JP 2001 040431 A, where subsequent amounts of $SiO_2$ were added to the slag 15 from Table 1 during a reduction step using iron, while air was injected, three intermediate slag compositions were disclosed of which one was containing 0.7% wt $Cu_2O$, 0.9% wt ZnO and only 21.5% wt $SiO_2$.

WO 2014/046593 A1 discloses a method for recovering evaporable metals and/or metal compounds from molten slag, by using a submerged jet of high energy hot plasma gas. The advantage is that high fuming rates are achievable far below the previously requested average slag temperatures. This brings the advantage of a reduced energy requirement, a reduced need for slag formers or flux materials and therefore also a reduced final amount of slag, and a reduced equipment wear. In the examples, mixtures of 1000 kg of Electric Arc Furnace (EAF) dust, 100 kg of coke and 100 kg of sand are treated to produce slags containing only 1.3% wt ZnO, corresponding to 1.04% wt of Zn, and at most 26.0% wt $SiO_2$. The slags produced in WO 2014/046593 A1 still contain sufficient zinc in order to be of concern with respect to metal leaching. WO 2014/046593 A1 is also unaware of possible advantageous effects of its slags when used in particular end-use applications.

A. F. S. Schoukens, L. R. Nelson and N. A. Barcza, "Plasma-Arc treatment of steel-plant dust and zinc-containing slag—Theoretical and Practical Considerations", Mintek Paper 8128, at The International Lead and Zinc Study Group Conference in Rome, Jun. 11-13, 1991, disclosed the "Mintek" Plasma-arc process for the treatment of steel-plant dust and of lead-smelter slag. The lead-smelter slag contained 14% wt ZnO and 2.8% wt PbO. Charcoal was used as the reducing agent, and dosed to selectively reduce the lead and zinc oxides, while leaving the iron as oxide in the slag. The slag which was tapped from the lead-smelter slag treatment had a temperature of 1500° C., which is stated to be necessary for the reduction of the zinc and lead oxides in the dust (point 4, $2^{nd}$ paragraph). The slag produced from the lead-smelter slag contained only 20% FeO, but as high as 26% wt CaO and 8% wt MgO. This slag has a relatively high melting temperature, bringing the drawbacks of a high energy requirement for its liquid processing.

WO 2013/156676 A1 discloses a method for processing slags of non-ferrous metallurgy, for converting them into a pulverized material suitable for other uses than dumping. The process comprises a reduction step wherein iron in the slag needs to be reduced to such a degree that the metal phase contains enough iron to make the metallic phase magnetic. The method involves sufficient mixing with the aim to keep the metal droplets within the molten slag and not to let the droplets settle down to the bottom of the furnace. The method further involves the vaporisation of zinc, lead, arsenic and cadmium from the mixture. The slag-metal mixture generated and left over in the reduction furnace is tapped and cooled. The cooled mixture is crushed and ground to a grain size of 20 μm-15 μm. Metals and possible sulphides are separated from the slag for instance by magnetic separation. Exemplified is the processing of slags containing either 4% Zn or 2.4% Zn. The starting slags are treated with silicon carbide (Examples 1 and 2) or with carbon (Example 3) as the reducing agents. In Example 3, nitrogen was bubbled through the mixture after the reduction. The resulting mixtures of metal alloy and slag contained high levels of Fe, less than 1.00% wt Zn, only up to 0.08% wt of Pb, and either at least 45% wt of $SiO_2$ or at most 1.3% wt CaO. The slags are reported to comprise metal inclusions, containing both copper and iron. The slag-metal mixtures of Examples 1 and 3 were pulverised, and subject to magnetic separation to separate out metals. Only for Example 3 was the composition reported of the residual non-magnetic end slag, and this composition was surprisingly similar to the composition reported for the mixture of metal alloy and slag before separating out the metal phase. The end slag is rich in SiO2 and contained not more than 1.4% CaO. WO 2013/156676 proposes to use the residual slag in road construction, in land filling applications, or as a constituent for concrete and cement. WO 2013/156676 is unaware of any potentially active function of its slag in the construction industry and/or for inorganic polymers.

There remains a need for upgrading the slag co-product from non-ferrous metal production, produced as co-product when processing primary and/or secondary feedstocks, using an easy and simple process, to a quality which is acceptable in terms of possible metal leaching and in addition is able to contribute actively, technically and therefore economically, into a downstream use of the slag without the drawbacks explained above.

The present invention aims to obviate or at least mitigate the above described problem and/or to provide improvements generally.

SUMMARY OF THE INVENTION

According to the invention, there is provided a slag, a process for the production of the slag, and uses of the slag as defined in any of the accompanying claims.

In an embodiment, the invention provides a slag co-product from non-ferrous metal production comprising, on a dry basis and whereby the presence of a metal is expressed as the total of elemental metal present and the presence of the metal in an oxidized state, preferably as an oxide form of the metal, on its own and/or in combination with other metals:
  a) at least 7% wt and at most 49% wt of iron, Fe,
  b) at most 1.3% wt of copper, Cu,
  c) at least 24% wt and at most 44% wt of silicon dioxide, $SiO_2$, and
  d) at least 2.0% wt and at most 20% wt of calcium oxide, CaO,
wherein the slag comprises, on the same basis,
  e) at least 0.10% wt and at most 1.00% wt of zinc, Zn,
  f) at least 0.10% wt and at most 2.5% wt magnesium oxide, MgO, and
  g) at most 0.100% wt of lead, Pb.

In an embodiment, the present invention provides an object comprising as a binder and/or as an aggregate the slag according to the present invention, which slag comprises at most 1.50% wt of zinc, Zn.

The inventors have found that the slag according to the present invention is able to act as a binder in a geopolymer system. The inventors have further found that the slag according to the present invention may also represent a very suitable aggregate for use in such geopolymer system, and that its use as an aggregate further contributes to extremely good properties of the products produced with such geopolymer system.

Compared to U.S. Pat. No. 5,749,962, the present invention brings the advantage that also zinc-containing feedstocks may be processed in the smelter. The process for producing the slag according to the present invention is able to remove the Zn which is present in the feedstocks and which ends up in the slag down to a level which is acceptable and raises little to no concerns in terms of health, industrial hygiene and the environment, but still sufficient to be noticed in a proper analytical technique, such as at least 0.10% wt.

The slag according to the present invention contains a minimum as well as a maximum amount of MgO as specified. The magnesium may enter into the slag because of its presence in the feedstocks of the process, but may also leach out of The applicants have found that the presence of a minimum amount of MgO in the slag is able to reduce the melting temperature of the slag significantly. The applicants have however also found that higher amounts of MgO may on the other hand again significantly increase the viscosity of the slag, and hence reduce or destroy the observed effect, and may even eventually lead to a slag with a viscosity that is higher than this without any MgO. Without wanting to be bound by this theory, the applicants believe that this effect is due to the MgO coming out of solution, possibly forming a spinel form, which is giving the slag a thick and fatty aspect. A relatively low presence of MgO coming out of solution is believed to readily and significantly increase the slag viscosity, which makes liquid processing very difficult. The slag according to the present invention is therefore specified to also contain at most the upper limit of MgO. Thanks to the presence of the MgO in the specified range, the slag is more fluid at the relatively low temperatures in the furnace where the slag is formed before it is subjected to the plasma treatment. This brings the advantage that a better separation may be achieved between the components in the slag and those in the liquid metal phase, such that a more concentrated metal phase may be obtained and at the same time a more concentrated slag phase, both in terms of the desired components for the two phases. This leads on the one hand to a higher recovery of the desired metals in the metal phase, a higher concentration of the desired metals in the metal phase, and on the other hand to a lower concentration of valuable metal values in the slag phase. The presence of the MgO as specified also brings the advantage that the requirements for the downstream process, in the case of the present invention the plasma treatment processing step of the slag in order to produce the final slag, are reduced. The plasma treatment step may occur at a lower temperature and still enjoy at least the desired fuming activity but even more importantly an improved separation between different phases, liquid-liquid as well as vapour-liquid, because of the better fluidity of the slag, e.g. the lower viscosity, and hence achieving at least the desired processing speeds in terms of fuming out zinc and/or lead from the slag and obtaining the slag according to the present invention. The MgO content of the slag in accordance to the present invention is therefore an important element of the present invention.

The slag according to the present invention contains a minimum amount of MgO as specified. The benefits and advantages thereof, in comparison of the disclosure in K. Koch and D. Janke, "Schlacken in der Metallurgie", ISBN 3-514-00254-1, as disclosed on page 157 and cited hereinabove, have already been discussed elsewhere in this document.

The slag in accordance to the present invention, in comparison with the treated QSL slag in the article by E. Hecker, B. Friedrich and J. Böhlke cited above in this document, brings the advantage of a lower concern with respect to Pb leaching in its application, and hence raises little to no concerns in terms of health, industrial hygiene and the environment.

The slag in accordance to the present invention, in comparison with the treated IS-slag in the article by E. Hecker, B. Friedrich and J. Böhlke cited above in this document, brings the advantage of being low in MgO. This brings the advantage that the melting point of the slag is reduced, and as a result thereof the fluidity of the slag is improved at the same temperature. This allows a reduction in the operating temperature, and hence energy requirement, and/or an improved separation between the liquid slag phase and the liquid metal phases in the process step where the slag and the metal are separated from each other by gravity, preferably a combination of both advantages. Thanks to the low presence of the MgO, the slag is more fluid at the relatively low temperatures in the furnace where the slag is formed before it is subjected to the plasma treatment. This brings the advantage that a better separation may be achieved between the components in the slag and those in the liquid metal phase, such that more a concentrated metal phase may be obtained and at the same time a more concentrated slag phase, both in terms of the desired components for the two phases. This leads on the one hand to a higher recovery of the desired metals in the metal phase, a higher concentration of the desired metals in the metal phase, and on the other hand to a lower concentration of valuable metal values in the slag phase. The low presence of the MgO also brings the advantage that the requirements for the downstream process, in the case of the present invention the plasma treatment processing step of the slag in order to produce the final slag, are reduced. The plasma treatment step may occur at a lower temperature and still enjoy at least the desired fuming activity, because of the better fluidity of the slag, e.g. the lower viscosity, and hence achieving at least the desired processing rates in terms of fuming out zinc and/or lead from the slag and obtaining the slag according to the present invention. The low MgO content of the slag in accordance to the present invention is therefore also an important element of the present invention.

The inventors have further found that slags containing fairly high concentrations of iron, typically in its oxide form, offer an excellent fluidity by themselves, and therefore require less calcium in order to achieve the same desired separation performance between slag and metal phase, and hence the desired low content of Pb and/or Zn in the slag, but also reducing the content of other valuable metals in the slag, such as Cu and/or Sn. The inventors therefore prefer to produce a slag containing at least 8% wt Fe, preferably at least 10% wt, more preferably at least 15% wt, even more preferably at least 20% wt, yet more preferably at least 25% wt, preferably at least 30% wt, more preferably at least 35% wt, even more preferably at least 37% wt of Fe. Converted to FeO, the inventors therefore prefer to produce a slag containing at least at least 9% wt of iron oxide, expressed as FeO and calculated as explained elsewhere in this document. Preferably, the slag contains at least 10% wt FeO, preferably at least 12% wt, more preferably at least 15% wt, even more preferably at least 20% wt, yet more preferably at least 30% wt, preferably at least 40% wt, more preferably at least 45% wt, even more preferably at least 50% wt of iron oxides, expressed as FeO. The applicants have found that this feature allows to produce a slag which is less rich in CaO, and which therefore requires lower amounts of CaCO3 to be added in order to obtain the desired good fluidity, low melting point, and hence good operability and separation at lower temperatures. The inventors therefore prefer that the slag contains at most 18% wt of CaO, preferably at most 15% wt, more preferably at most 12% wt, even more preferably at most 10% wt, yet more preferably at most 8.0% wt.

In another embodiment, the invention provides a process for the production of a second slag according to the present invention, wherein the slag comprises at most 1.50% wt of zinc, Zn, and at least 1.0% wt of CaO, the process comprising the steps of
  providing a first slag containing at least one metal selected from zinc, lead, and combinations thereof,
  introducing the first slag in a fumer,
  fuming at least one metal selected from zinc, lead, and combinations thereof, from the first slag using at least one plasma torch to obtain a second slag, and
  removing the second slag from the fumer.

The inventors have found that the slag according to the present invention may readily be produced by the process according to the present invention, in particular that the process is able to readily achieve the desired low levels of Pb and Zn, in a single and relatively simple process step. The inventors believe that this process brings significant advantages over the processes known in the art, such as the process of WO 2013/156676 A1 comprising first a reduction step in an electrical furnace followed by a fine grinding of the material plus a magnetic separation of the metal particles from the remaining slag. The inventors have further found that the process according to the present invention does not require the high amounts of flux material required by other methods known in the art, which materials would be diluting and possibly even suppressing the technical contribution which the slag is otherwise able to make into its use as a binder in the construction industry.

The inventors have further found that the slag according to the present invention is sufficiently low in zinc and/or lead content, such that the slag does not represent a concern for metal leaching, and hence may be considered as being acceptable in economically more attractive end-use applications.

The inventors have further found that with the process according to the present invention, a slag could be produced having a very low Pb content, and which may therefore be able to avoid the additional labelling requirements possibly becoming imposed by the CLP regulation in preparation under certain jurisdictions. The slag may therefore also remain readily acceptable for use in many current applications where conventional slags may risk to become unacceptable or undesired. In addition, in case of a surplus availability of slag over its commercial demand, the burden and cost of landfilling such surplus of the slag according to the present invention remains limited.

The inventors have further found that the slag according to the present invention, in particular when using the process according to the present invention, is having a particularly low zinc content. The inventors have found that when using the slag according to the present invention in concrete and/or cement, that the hardening rate of the composition is not anymore reduced significantly, as is the case with higher Zn containing slags.

In yet another embodiment, the invention provides for a variety of uses of the slag according to the present invention, as specified in a number of use claims.

The inventors have found that the slag according to the present invention, whereby the slag comprises at most 1.50% wt of zinc, Zn, and at least 1.0% wt of CaO, may be used as an active binder in the construction industry. The slag may be used as a partial replacement of Portland cement. Such an activity may be called "pozzolanic activity", which is defined as a measure for the degree of reaction over time or the reaction rate between a pozzolan and $Ca^{2+}$ or $Ca(OH)_2$ in the presence of water. The rate of the pozzolanic reaction is dependent on the intrinsic characteristics of the pozzolan, such as the specific surface area, the chemical composition and the active phase content. Physical surface adsorption is not considered as being part of the pozzolanic activity, because no irreversible molecular bonds are formed in the process. The inventors have for instance found that with addition of slag according to the present invention, in an amount of about 30% replacement for Portland cement, 30% less of the Portland cement may be used, while a concrete product may be produced from this mixture showing a compressive strength which is only 6% below the compressive strength of the same product produced with 100% cement. Without wishing to be bound by this theory, the inventors believe that this capability is enabled by the low presence of zinc, below the level at which it may act as a poison or contaminant disturbing the activity of the slag. The inventors have found that a similar slag containing about 8% wt of zinc was unable to exhibit this activity.

In yet another embodiment, the invention therefore provides for a use of the slag according to the present invention as an ingredient selected from the list consisting of a filler, a binder, and combinations thereof, in the construction industry.

The inventors have found that the slag according to the present invention, in particular when ground, when this second slag was used as a partial replacement for Portland cement as the binder in a composition, was performing significantly better than the equivalent derived from the first slag from which the slag according to the present invention was derived by applying the process according to the present invention, and which contained about 8% wt of zinc, Zn, and in the range of 0.3-0.5% wt of lead, Pb. The inventors believe that this performance difference may be due to the lower zinc content, building on the observation that zinc slows down the activity of conventional cement. The inventors have found that this performance difference is already significant with the slag comprising at most 1.50% wt of zinc, Zn, and at least 1.0% wt of CaO.

The inventors have found that the slag according to the present invention may also be used for bringing a number of other technical effects.

In an embodiment, the slag according to the present invention, whereby the slag comprises at most 1.50% wt of zinc, Zn, and at least 1.0% wt of CaO, may be used in an end-use selected from providing a wear layer and/or coating for roofing tiles or roofing shingles, as a blasting sand or blasting grit component, as a foamed tile component, as a black colorant, preferably in construction products, more preferably in black tiles, as black hard chunks, preferably for decorative purposes, and as a high density ballast, preferably for underwater applications, more preferably for hydraulic engineering, and for combinations thereof.

In yet another embodiment, whereby the slag comprises at most 1.50% wt of zinc, Zn, and at least 1.0% wt of CaO, the invention provides for an effect selected from for the reduction of the baking temperature of a brick or of a clay brick, for sound insulation, for shielding X-rays, and combinations thereof.

The inventors have found that the slag has a high material density, in the range of 2.9-4.0 ton/m$^3$. Furthermore, the slag was found to be non-porous. Hence, the slag may bring the effect of good sound insulation. The inventors have further found that in particular the high material density makes the slag suitable and of exceptional interest for X-ray shielding The inventors have found that the slag has a very dark black colour. Although the black colour is fairly common for fayalitic slags, the inventors have found that this colour in the slag according to the present invention is extremely stable, in particular in comparison to many alternative colorants. Thanks to the low zinc and low lead content, the slag according to the present invention may therefore be used as a suitable colorant for producing black construction products, such as black floor tiles, which are currently highly popular, and for which currently iron oxide, FeO, is used, but which is a more scarce and rather costly raw material.

DETAILED DESCRIPTION

The present invention will be described in the following with respect to particular embodiments but the invention is not limited thereto but only by the claims.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B. Accordingly, the terms "comprising" and "including" encompass the more restrictive terms "consisting essentially of" and "consisting of".

In this document and unless specified differently, amounts of metals and oxides are expressed in accordance with the typical practice in pyrometallurgy. The presence of each metal is typically expressed in its total presence, regardless whether the metal is present in its elemental form (oxidation state=0) or in any chemically bound form, typically in an oxidized form (oxidation state>0). For the metals which may relatively easily be reduced to their elemental forms, and which may occur as molten metal in the pyrometallurgical process, it is fairly common to express their presence in terms of their elemental metal form, even when the composition of a slag is given, wherein the majority of such metals may actually be present in an oxidized form. It is therefore that the composition of a slag such as the slag according to the present invention specifies the content of Fe, Zn, Pb, Cu, Sb, Bi as elemental metals. Less noble metals are more difficult to reduce under non-ferrous pyrometallurgy conditions and occur mostly in an oxidized form. These metals typically are expressed in terms of their most common oxide form. Therefore slag compositions are typically giving the content of Si, Ca, Al, Na respectively expressed as $SiO_2$, $CaO$, $Al_2O_3$, $Na_2O$.

The Kaldo process, as used in U.S. Pat. No. 4,571,260 and in WO 2013/156676 A1, is a conventional pyrometallurgy process which uses a top blown rotary converter (TBRC—Kaldo furnace or Kaldo converter), in which molten metal as the heavier phase and a molten slag phase as the lighter phase may occur simultaneously. The heat in this process is provided with the aid of an oxygen-fuel flame and later by introduction of coke or some other suitable reductant into the already molten liquid(s). The plasma process according to the present invention makes use of a plasma torch for fuming some of the metals out of the slag. The process according to the present invention is more performing because the very high temperature plasma flow, with temperatures significantly above 1500° C. and readily at least 3000° C. and even 5000° C., is able to cause local temperatures which are much higher than the average temperature in the melt, and is more flexible as compared to conventional burner systems because it allows to control the oxygen potential virtually independently from the amount of heat being generated.

In an embodiment, the slag according to the present invention comprises at least 8% wt Fe, preferably at least 10% wt, more preferably at least 15% wt, even more preferably at least 20% wt, yet more preferably at least 25% wt, preferably at least 30% wt, more preferably at least 35% wt, even more preferably at least 37% wt. In another embodiment the slag according to the present invention comprises at most 48% wt of Fe, preferably at most 47% wt, more preferably at most 45% wt, even more preferably at most 43% wt, yet more preferably at most 41% wt. The content of Fe in a slag from non-ferrous metal production is preferably determined according to the method described in DIN EN ISO 11885.

In an embodiment, the slag according to the present invention comprises at least 22% wt $SiO_2$, preferably at least 24% wt, more preferably at least 25% wt, even more preferably at least 26% wt, yet more preferably at least 27% wt, preferably at least 28% wt, more preferably at least 29%, even more preferably at least 30.0% wt. In another embodiment the slag according to the present invention comprises at most 42% wt of $SiO_2$, preferably at most 40% wt, more preferably at most 37% wt, even more preferably at most 33% wt, yet more preferably at most 32% wt. The content of $SiO_2$, in a slag from non-ferrous metal production is preferably determined according to the method described in DIN EN ISO 12677. The $SiO_2$ content may also be determined indirectly, by first determining the content of silicon, Si, using the method according to DIN EN ISO 11885, and then converting this result to the oxide $SiO_2$.

The inventors have found that the presence of significant amounts of $SiO_2$ in the slag according to the present invention, as specified in the claims, is a strong factor in avoiding explosions when the slag is quenched with water, upon pouring the molten slag from its container. The slag is inevitably rich in iron, as FeO. At sufficiently high temperatures, FeO may act as a catalyst for the decomposition reaction of water into $O_2$ gas and $H_2$ gas. Hydrogen gas, in mixture with air and definitely with oxygen, has a very wide explosion range, and hence readily explodes in mixture with air or oxygen in presence of an ignition source. The applicants have found that the presence of sufficient $SiO_2$ in the slag is able to suppress the catalytic activity of the iron present in the slag for decomposing the water in the quenching step into explosive mixtures. A further advantage of the presence of more $SiO_2$ is that this improves the fluidity of the slag, such that lower temperatures are sufficient in order to achieve the same degree and ease of separation between molten slag and molten metal phases, and hence to achieve the desired good separation in terms of desired metal content of the two phases.

On the other hand, keeping the $SiO_2$ content of the slag below the upper limit as specified, brings the advantage that the slag melting temperature remains lower. At higher $SiO_2$ contents, the inventors have found that the slag melting temperature increases. The slag melting temperature is often also called the slag "liquidus temperature". Without wanting to be bound by this theory, the applicants believe that at high concentration, part of the $SiO_2$ may come out as a separate phase, which may have a high viscosity. It may be this separate highly viscous phase which is responsible for the processing problems at high $SiO_2$ contents. Keeping the $SiO2$ content of the slag below the specified upper limit brings the further advantage that the amount of slag by-product for the same amount of prime metal produced is reduced. This reduces the processing burden in order to upgrade this slag, such as with the process in accordance with the present invention.

In an embodiment, the slag according to the present invention comprises at least 1.0% wt CaO, preferably at least 1.2% wt, more preferably at least 1.4% wt, even more preferably at least 1.75% wt, yet more preferably at least 2.0% wt, preferably at least 2.25% wt, more preferably at least 2.50 wt %, even more preferably at least 3.00% wt. In another embodiment the slag according to the present invention comprises at most 18% wt of CaO, preferably at most 15% wt, more preferably at most 12% wt, even more preferably at most 10% wt, yet more preferably at most 8.0% wt. The content of CaO, in a slag from non-ferrous metal production is preferably determined according to the method described in DIN EN ISO 11885.

The applicants have found that the levels of CaO as prescribed bring on the one hand, by respecting the lower level, the advantage of improving the fluidity of the slag and of reducing the melting point (or "liquidus temperature") of the slag. This brings advantages in terms of the operability of the slag processing in a molten form and allows for an improved separation from a molten metal phase at a lower temperature. The CaO level in the slag is primarily coming from added flux material, such as $CaCO_3$. The applicants have found that the addition of CaO into the process, such as by adding $CaCO_3$ which then converts to CaO, improves the recovery of metal from the slag in the upstream metal recovery process steps, facilitates the achievement of low Pb levels, and improves the fluidity of the slag. The applicants have also found that CaO brings further advantages when the slag product is used in geopolymers. The prescribed levels, in particular the upper limit, therefore also bring the advantage that no excessive amounts of such added flux material needs to be obtained and introduced. In addition, these levels also reduce the amount of slag coproduct which is produced, which reduces the slag processing burden, including the associated waste stream disposal burdens.

The applicants have further found that the desire to reach particular levels of CaO in the slag allows for the judicious and partial acceptance, in the upstream metal recovery process step, of feedstocks which contain various kinds of metals of interest, but which may be rich in disturbing Ca compounds. These feedstocks are usually waste streams from other processes and typically represent a high disposal burden for the operators thereof. Examples of such materials are waste water treatment sludges containing gypsum ($CaSO_4$).

Respecting the upper limit on CaO content brings the advantage that less SiO2 may be needed in order to keep the CaO in solution, and that the amount of slag may be kept lower. A lower need for CaO in the slag brings the further advantage that less $CaCO_3$ and/or $CaSO_4$ may need to be introduced, which significantly reduces the energy requirement of the process because the smelting and decomposition of these calcium sources is highly energy intensive.

In an embodiment, the slag according to the present invention comprises at most 1.50% wt of Zn, preferably at most 1.40% wt, more preferably at most 1.30% wt, even more preferably at most 1.20% wt, yet more preferably at most 1.10% wt, preferably at most 1.00% wt, more preferably at most 0.90% wt, even more preferably at most 0.80% wt, yet more preferably at most 0.70% wt. The content of Zn in a slag from non-ferrous metal production is preferably determined according to the method described in DIN EN ISO 11885. In another embodiment, the slag comprises at least 0.10% wt of Zn, preferably at least 0.15% wt, more preferably at least 0.20% wt, even more preferably at least 0.25% wt, yet more preferably at least 0.30% wt, preferably at least 0.35% wt, more preferably at least 0.40% wt and even more preferably at least 0.50% wt. While on the one hand, the applicants prefer to bring the zinc content level below the upper limit as specified, with the advantage of reduced leaching risk and the slag not running the risk for being subject to hazardous classification, the applicants prefer on the other hand to also keep the zinc content level above a particular lower limit, because the burden and costs for the removal of zinc from the slag then remain acceptable.

In an embodiment, the slag according to the present invention comprises at most 0.30% wt of Pb preferably at most 0.25% wt, more preferably at most 0.20% wt, even more preferably at most 0.15% wt, yet more preferably at most 0.100% wt, preferably at most 0.050% wt, more preferably at most 0.040% wt, even more preferably at most 0.030% wt, yet more preferably at most 0.026% wt. The content of Pb in a slag from non-ferrous metal production is preferably determined according to the method described in DIN EN ISO 11885. In another embodiment, the slag comprises at least 0.005% wt of Pb, preferably at least 0.010% wt, more preferably at least 0.015% wt, even more preferably at least 0.020% wt, yet more preferably at least 0.025% wt, preferably at least 0.030% wt, more preferably at least 0.035% wt and even more preferably at least 0.040% wt. While on the one hand, the applicants prefer to bring the lead content level below the upper limit as specified, with the advantage of reduced leaching risk and the slag not running the risk of being subject to hazardous classification, the applicants prefer on the other hand to also keep the lead content level above a particular lower limit, because the burden and costs for the removal of lead from the slag then remain acceptable.

In an embodiment, the slag according to the present invention comprises at most 1.30% wt of copper, Cu, preferably at most 1.10% wt, more preferably at most 1.00% wt, even more preferably at most 0.90% wt, yet more preferably at most 0.80% wt, preferably at most 0.75% wt, more preferably at most 0.70% wt, even more preferably at most 0.60% wt, yet more preferably at most 0.40% wt. The content of Cu in a slag from non-ferrous metal production is preferably determined according to the method described in DIN EN ISO 11885. In another embodiment, the slag comprises at least 100 ppm wt of Cu, preferably at least 0.05% wt, more preferably at least 0.10% wt, even more preferably at least 0.15% wt, even more preferably at least 0.20% wt of Cu. Preferably the slat comprises at least 0.30% wt, more preferably at least 0.35% wt, even more preferably at least 0.40% wt of Cu.

The presence of a small but measurable amount of copper, as may be specified in the claims, allows for the processing of copper containing raw materials in the production of the slag according to the present invention. The applicants prefer to keep the copper content of the slag below an upper limit in order to recover as much as possible of the copper in the raw materials into the more valuable metallic form. In addition, copper is a metal which often occurs in a form which may leach out of the slag. Copper affects the life of algae in an aqueous environment. Leaching of copper may therefore raise envirotoxic concerns in some of the potential applications for the slag in accordance with the present invention. On the other hand, the applicants prefer to keep the copper content in the slag above a lower limit because the efforts and associated costs to remove further amounts of copper from the slag become increasingly high. Leaving a level of copper as specified above the lower limit therefore simplifies the feedstock processing burden and its associated operating costs.

In an embodiment, the slag according to the present invention comprises at most 2.5% wt of magnesium oxide, MgO, preferably at most 2.00% wt, more preferably at most 1.50% wt, even more preferably at most 1.3% wt, yet more preferably at most 1.20% wt, preferably at most 1.10% wt, more preferably at most 1.00% wt. The content of MgO in a slag from non-ferrous metal production may be determined by converting the analytical result for magnesium, Mg into MgO. The magnesium content of such a slag is preferably determined according to the method described in DIN EN ISO 11885. In another embodiment, the slag comprises at least 0.10% wt of MgO, preferably at least 0.20% wt, more preferably at least 0.30% wt of MgO. Preferably, the slag comprises at least 0.40% wt of MgO, preferably at least 0.50% wt, more preferably at least 0.60% wt, even more preferably at least 0.70% wt, yet more preferably at least 0.75% wt.

The advantages of the specified MgO levels in the slag according to the present invention have been explained at large elsewhere in this document.

The method described in DIN EN ISO 11885 makes use of inductively coupled plasma atomic emission spectroscopy (ICP-AES), also referred to as inductively coupled plasma optical emission spectrometry (ICP-OES).

In an embodiment, the slag according to the present invention comprises at most 2.0% wt of sulphur, S, preferably at most 2.00% wt, more preferably at most 1.50% wt, even more preferably at most 1.25% wt, yet more preferably at most 1.00% wt, preferably at most 0.50% wt, more preferably at most 0.40% wt, even more preferably at most 0.30% wt, yet more preferably at most 0.20% wt. The content of S in a slag from non-ferrous metal production is preferably determined following to a major extent the method described in ISO 15350. In another embodiment, the slag comprises at least 0.05% wt of S.

In an embodiment, the slag according to the present invention further comprises, at least 9% wt and at most 63% wt of iron oxide, expressed as FeO. This content is again expressed on the same basis as in claim 1, i.e. on a dry basis. The FeO content may readily be obtained by converting the content of elemental Fe into FeO. In this context, the Fe content is expressed as the total of elemental metal present and the presence of the metal in an oxidized form. In an embodiment, the slag according to the present invention comprises at least 10% wt FeO, preferably at least 12% wt, more preferably at least 15% wt, even more preferably at least 20% wt, yet more preferably at least 30% wt, preferably at least 40% wt, more preferably at least 45% wt, even more preferably at least 50% wt. In another embodiment the slag according to the present invention comprises at most 60% wt of FeO, preferably at most 58% wt, more preferably at most 56% wt, even more preferably at most 54% wt, yet more preferably at most 53% wt.

In an embodiment, the slag according to the present invention comprises at most 5.0% wt of sodium oxide, $Na_2O$, preferably at most 4.50% wt, more preferably at most 4.00% wt, even more preferably at most 3.75% wt, yet more preferably at most 3.50% wt, preferably at most 3.25% wt, more preferably at most 3.10% wt, even more preferably at most 3.00% wt, yet more preferably at most 2.90% wt. The content of $Na_2O$ in a slag from non-ferrous metal production may be determined by converting the analytical result for sodium, Na into $Na_2O$. The sodium content of such a slag is preferably determined according to the method described in DIN EN ISO 11885. In another embodiment, the slag comprises at least 1.00% wt of $Na_2O$.

The applicants have found that the presence of sodium in the feedstocks of the process producing the slag is at least partially responsible for the content of $Na_2O$ in the slag according to the present invention. The applicants have further found that the presence of $Na_2O$ is able to reduce the melting temperature of the slag significantly. Thanks to the presence of the $Na_2O$, the slag is more fluid at the relatively low temperatures in the furnace where the slag is formed before it is subjected to the plasma treatment. This brings the advantage that a better separation may be achieved between the components in the slag and those in the liquid metal phase, such that more a concentrated metal phase may be obtained and at the same time a more concentrated slag phase, both in terms of the desired components for the two phases. This leads on the one hand to a higher recovery of the desired metals in the metal phase, a higher concentration of the desired metals in the metal phase, and on the other hand to a lower concentration of valuable metal values in the slag phase. The presence of the $Na_2O$ also brings the advantage that the requirements for the downstream process, in the case of the present invention the plasma treatment processing step of the slag in order to produce the final slag, are reduced. The plasma treatment step may occur at a lower temperature and still enjoy at least the desired fuming activity and phase separation rate, because of the better fluidity of the slag, e.g. the lower viscosity, and hence achieving at least the desired processing speeds in terms of fuming out zinc and/or lead from the slag and obtaining the slag according to the present invention. The $Na_2O$ content of the slag in accordance to the present invention is therefore a further relevant element in the context of the present invention.

In an embodiment, the slag according to the present invention further comprises, on the same basis, at least 3% wt and at most 12% wt of aluminium oxide, $Al_2O_3$. Preferably the slag comprises at least 3.0% wt $Al_2O_3$, more preferably at least 4.0% wt, even more preferably at least 5.0% wt, yet more preferably at least 6.0% wt, preferably at least 7.0% wt, more preferably at least 7.5 wt %, even more preferably at least 8.0% wt. In another embodiment the slag according to the present invention comprises at most 11.5% wt of $Al_2O_3$, preferably at most 11.0% wt, more preferably at most 11.0% wt, even more preferably at most 10.5% wt, yet more preferably at most 10.0% wt. The content of $Al_2O_3$, in a slag from non-ferrous metal production is preferably determined according to the method described in DIN EN ISO 11885 for determining the content of aluminium or "aluminum", and converting the result into the aluminium oxide $Al_2O_3$.

The applicants have found that the raw materials of the process according to the present invention may introduce Al, such as by introducing bronze into the process. Al may also be introduced as a metal on purpose, e.g. as a reductant, i.e. by oxidising to form $Al_2O_3$ the aluminium may assist in the reduction of e.g. an oxide of a more noble metal into its elementary metal form. The applicants have found that aluminium metal as reductant may bring a relatively high amount of energy into the process. The applicants have found that the presence of the specified amounts of aluminium may bring the advantage of a reduction of the melting temperature of the slag, with all the associated benefits already discussed elsewhere in this document. The applicants further believe that the presence of the specified amounts of Al2O3 positively affect the performance of the slag as a geopolymer.

On the other hand, the applicants prefer to respect the upper limit as specified for $Al_2O_3$, because they have found that excessive levels of $Al_2O_3$ may increase the slag viscosity and hence bring processing impairments.

In an embodiment, the slag according to the present invention comprises at most 1.50% wt of zinc oxide, ZnO, preferably at most 1.40% wt, more preferably at most 1.30% wt, even more preferably at most 1.20% wt, yet more preferably at most 1.10% wt, preferably at most 1.05% wt, more preferably at most 1.00% wt, even more preferably at most 0.95% wt, yet more preferably at most 0.90% wt. The content of ZnO in a slag from non-ferrous metal production may be determined by converting the analytical result for zinc, Zn, into ZnO. The zinc content of such a slag is preferably determined according to the method described in DIN EN ISO 11885. In another embodiment, the slag comprises at least 0.25% wt of ZnO.

In an embodiment, the slag according to the present invention comprises at most 0.323% wt of lead oxide, PbO, preferably at most 0.300% wt, more preferably at most 0.250% wt, even more preferably at most 0.200% wt, yet more preferably at most 0.100% wt, preferably at most 0.050% wt, more preferably at most 0.030% wt, even more preferably at most 0.028% wt, yet more preferably at most 0.020% wt. The content of PbO in a slag from non-ferrous metal production may be determined by converting the analytical result for lead, Pb, into PbO. The lead content of such a slag is preferably determined according to the method described in DIN EN ISO 11885. In another embodiment, the slag comprises at least 0.005% wt of PbO.

In an embodiment of the slag according to the present invention, the iron present in the slag is primarily present in the fayalitic structure $Fe_2SiO_4$, also called iron chrysolite.

In an embodiment of the slag according to the present invention, the slag is having an amorphous content of at least 30% wt, as determined by quantitative X-ray diffraction (XRD) analysis using Topas Academic Software V5 and using $Al_2O_3$ as internal standard, preferably at least 50% wt, more preferably at least 70% wt, even more preferably at least 80% wt, yet more preferably at least 85% wt amorphous content. A higher amorphous content of the slag brings the advantage to the slag that the slag has a better grindability. This property is in particular of interest when small particles are desired, such as when the slag is to be used as a binder. In another embodiment the slag is at least significantly crystalline, such as at least 30% crystalline, preferably at least 50%, more preferably at least 70%. A high crystallinity brings the advantage of a high hardness and high strength, also of a high dark black colour, which is of particular interest in other end uses such as armour stone and for other decorative purposes.

In an embodiment the slag according to the present invention is having a granulate form with an average particle diameter (d50, as calculated on a weight basis and obtainable via sieving) of at least 0.5 mm and at most 5.0 mm, preferably at least 0.7 mm, more preferably at least 0.9 mm, and optionally at most 3.0 mm, preferably at most 2.0 mm. The fineness of the grind slag may also be expressed by its "Blaine value", which is a value commonly used for indicating the fineness of the grind (specific surface) of cement. The fineness of grind is determined by measuring the air permeability [$cm^2/g$] according to DIN 1164 part 4. The Blaine value of the slag in an embodiment according to the invention should be in the range of 1800-6000, preferably at least 2000, more preferably at least 2200, even more preferably at least 2500, yet more preferably at least 3000. In an embodiment the Blaine value of the slag is at most 5500, preferably at most 5000, more preferably at most 4500, and even more preferably at most 4000. These Blaine values are particularly advantageous when the slag is used as a binder.

In an embodiment, the slag according to the present invention is having a powder form with an average particle diameter (d50), as determined by wet sieving and therefore an average calculated on a weight basis, of at least 10 µm and at most 500 µm, preferably at least 20 µm, more preferably at least 30 µm, and optionally at most 200 µm, preferably at most 100 µm, more preferably at most 50 µm. This brings advantages particularly when the slag is to be used as a binder.

In an embodiment of the slag according to the present invention, at least 90% wt of the particles (d90) have a diameter of at most 200 µm, as determined by wet sieving, preferably of at most 150 µm, more preferably of at most 100 µm. This brings the advantage that the amount of larger particles is very limited, such that the slag is highly manageable and leads to a smooth paste when the slag is used as a binder.

In an embodiment, the slag according to the present invention is having the form of chunks having an average particle diameter (d50, as calculated on a weight basis) of at least 4 mm and at most 200 mm. In a particular embodiment, the slag has an average particle diameter in the range of 4-20 mm. This form of the slag is very suitable for other applications, such as aggregate. In another particular embodiment, the slag has an average particle diameter in the range of 50-200 mm. This form of the slag may be suitable for instance as decorative elements such as armour stone.

In an embodiment of the object according to the present invention, the object is further comprising an aggregate, wherein the aggregate preferably comprises sand and/or the slag according to the present invention, which comprises at most 1.50% wt of zinc, Zn. The applicants have found that the slag is also highly suitable as aggregate in the construction industry, alone or in combination with other aggregates such as sand. The slag may bring strength improvements and also improve the aesthetics of the end product.

In an embodiment of the object according to the present invention, the slag comprises at least 1.0% CaO and the slag is present as a binder, whereby the object is further comprising an activator. The applicants have found that the slag according to the present invention may act as an active binder, capable of reacting with a suitable activator and thereby exhibiting strong binding properties for aggregates. The slag may therefore be used in replacement of Portland cement, or as the only binder in an object in which case it is considered a "geopolymer", which are e.g. bringing fire- and heat-resistant properties to coatings, adhesives, composites, etcetera.

Geopolymers are typically amorphous materials having framework structures with repeating units, which in this case comprise Fe and Si atoms linked by shared oxygen atoms. The applications for geopolymers occur in a wide variety, many of them inspired by the fire and heat resistance of the materials.

In an embodiment comprising an activator, the activator is selected from the group consisting of sodium hydroxide, NaOH, potassium hydroxide, KOH, sodium silicate, $Na_2SiO_3$, potassium silicate, $K_2SiO_3$, and combinations thereof, preferably the activator being NaOH.

In an embodiment, the object according to the present invention is a construction element, preferably an element selected from the list consisting of a tile, a paver, a block, a concrete block, and combinations thereof.

The object according to the present invention may possibly be baked, which may bring the advantage of a colour change, such as ending up with a reddish colour. Also a curing step may be applied, at a lower temperature than baking, but e.g. at a temperature in the range of 120-250° C., which may readily contribute to the mechanical properties of the object, as well as to the aesthetic aspects.

In an embodiment, the object according to the present invention is having a foamed structure. This brings the advantage that the conductivity for heat and sound is reduced, such that the object may exhibit heat and/or sound insulation properties, and find an increased acceptability in applications where these properties are desired or required.

The process according to the present invention makes use of a plasma torch. In a plasma torch, an electric arc is generated between two electrodes in between which is passing a gas stream, such as air or an inert gas. The electric arc heats up the gas stream to very high temperatures, and after optional mixing with a reductant such as natural gas, the hot gas stream is then injected into the molten slag bath. It is the hot gas stream passing through the slag bath which heats up the slag bath. On its way to the surface, the gas stream picks up the fumable metals such as Zn and/or Pb. Alternatively, a reductant may be added to the slag bath, such as a form of solid carbon or carbon-containing material, preferably petcokes. In this case the plasma torch brings energy, and it is the reductant in the bath which makes the reduction possible.

An important advantage of the fuming process using the plasma torch, as compared to the DC-EAF process discussed above in this document, is the much lower investment and maintenance costs for the processing equipment. In particular the electric equipment and the arc generation equipment are much simpler, and the furnace containing the slab bath is not a part of the electrical circuit for generating the electric arc. A further advantage is that the plasma torch process is much better suitable for fuming because the process inherently comprises the passing of a significant amount of gas through the slag bath, resulting in intensive bath agitation. In a DC-EAF process, the anode is formed by a molten metal phase underneath the molten slag. The process requires that the two liquid phases remain clearly separate and continuous, and therefore cannot allow the same extent of agitation in the liquid bath as in the plasma torch process. The plasma torch process is therefore much more efficient in fuming zinc and/or lead from slag than is the DC-EAF process.

The DC-EAF process described in the article by by E. Hecker, B. Friedrich and J. Böhlke cited above in this document, as well as the plasma-arc treatment process disclosed by A. F. S. Schoukens, L. R. Nelson and N. A. Barcza, "Plasma-Arc treatment of steel-plant dust and zinc-containing slag—Theoretical and Practical Considerations", is thus much less suitable for the fuming of zinc and/or lead in accordance with the present invention.

A suitable process for the present invention is discussed in K. Verschuere et al, "Continuous Fuming of Zinc-Bearing Residues: Part II, The Submerged-Plasma Zinc-Fuming Process", Metallurgical and Materials Transactions B, Vol. 38B, February 2007, pp. 21-33. The authors used a model to investigate potential effects of the many operating parameters on bath temperature, heat loss, Zn concentration and content in slag, Cu concentration, and content in matte. The slag produced in the base case contains 3.25% wt ZnO in addition to 0.78% wt ZnS, together representing a Zn content of 3.13% wt in the slag. In all the simulations, the Zn concentration in the remaining slag is at least 1.3% wt Zn. With respect to the amount of MgO in the feed, the document teaches in FIG. 12 to operate with a MgO/feed input (wt %) of at least 3% in order to reduce the Zn content of the slag.

In an embodiment of the process according to the present invention, the first slag is introduced into the fumer as a liquid. This brings the advantage that the feed material does not need to be melted in the fumer, such that the amount of heat input into the fumer remains limited. It is highly advantageous to combine the process according to the present invention with other pyrometallurgy processes on the same site, which may produce the first slag in a liquid form and which may readily be fed as such into the fumer according to the present invention.

In an embodiment of the process according to the present invention, the first slag is heated in the fumer, preferably by the plasma torch.

In an embodiment of the process according to the present invention, at least part of the first slag is melted by the plasma torch in the fumer. This brings the advantage that also solid first slag may be processed in the process according to the present invention.

In an embodiment of the process according to the present invention, during the fuming the plasma torch is submerged into the molten slag present in the fumer. This brings the advantages of a high agitation of the molten slag by the flow of hot plasma fluid, of an intensive contact of the slag with the high temperature plasma fluid, and of a very effective fuming of the metals which are prone for being fumed out, such as zinc and lead.

In an embodiment of the process according to the present invention, an oxide selected from CaO, $Al_2O_3$, and combinations thereof, is added to the slag in the fumer, preferably at a temperature of at least 1000° C., preferably at least 1050° C., more preferably about 1150° C. This brings the advantage that the final composition of the second slag after fuming may be further optimised and stabilised, and making the slag more suitable for particular end uses by possibly also affecting the mineralogy. The applicants have found that the addition at high temperature, such as specified, and in the molten state, is more effective in obtaining the desired effects.

In an embodiment of the process according to the present invention, the second slag is cooled down to become a solid, preferably the second slag being removed from the fumer as a liquid. The advantage is that the fumer may be released for further slag treatment while the second slag is cooling down. The slag may be cooled and/or solidified by contacting the slag with a cooling medium, such as air, possibly environment air.

In an embodiment of the process according to the present invention, the cooling of the slag is performed by contacting the liquid second slag with water. The applicants have found that cooling with water is very effective and may be applied in a variety of ways resulting in relatively well controlled cooling rates.

In an embodiment of the process according to the present invention, the second slag is cooled at a rate of at least 40 degrees Celsius per second, preferably at least 50 degrees Celsius per second, more preferably at least 60 degrees Celsius per second. The applicants have found that with the higher cooling rate, as specified, a higher amorphous content of the slag may be obtained, which is of interest for particular end uses, such as when the slag is intended for use as a binder.

In an embodiment of the process according to the present invention, the process is further comprising the step of grinding the solid second slag, preferably grinding the slag into a powder.

In an embodiment of the process according to the present invention, the second slag is cooled at a rate of at most 30 degrees Celsius per second, preferably less than 30 degrees Celsius per second, more preferably at most 20 degrees Celsius per second. The applicants have found that with the lower cooling rate, as specified, a lower amorphous content of the slag may be obtained, and hence a higher crystallinity, which is of interest for particular end uses, such as when the slag is intended for use as an aggregate or for decorative purposes.

In an embodiment of the present invention, the slag comprises at most 1.50% wt of zinc, Zn, and at least 1.0% wt of CaO, and the slag is used as a binder for aggregates, preferably as an active binder, preferably as a binder having pozzolanic activity. The applicants have found that the slag may act as a binder in replacement of cement, such as when partially replacing cement, such as Portland cement, but also as a binder for producing geopolymer compositions.

In an embodiment of the present invention wherein the slag is used as a binder for aggregates, the slag is used as a replacement for Portland cement, preferably as a partial replacement for Portland cement.

In an embodiment of the present invention wherein the slag is used as a binder for aggregates, the slag comprises at most 1.50% wt of zinc, Zn, and at least 1.0% wt of CaO and the slag is used as a binder in an inorganic polymer composition, preferably in combination with a base, more preferably as the main binder in an inorganic polymer composition, even more preferably as the only binder in an inorganic polymer composition.

In an embodiment of the present invention, the use is further comprising the step of foaming the inorganic polymer composition. The result is a foamed composition which may be desired for its insulation properties with respect to heat and/or sound.

In an embodiment involving foaming, the slag may be used for improving thermal and/or sound insulation.

In an embodiment of any one of the uses according to the present invention, wherein the slag comprises at most 1.50% wt of zinc, Zn, and at least 1.0% wt of CaO, the slag is used in combination with an additional oxide or a precursor thereof selected from calcium oxide, CaO, aluminium oxide, $Al_2O_3$, calcium hydroxide, $Ca(OH)_2$, calcium carbonate, $CaCO_3$, calcium sulphate, $CaSO_4$, preferably the slag and the additional oxide or precursor being mixed together before the use.

The applicants have found that the additional oxide or the precursor thereof may be introduced as blast furnace slag, as suitable non-ferrous slag, as gypsum-containing resides, hence comprising $CaSO_4.2H_2O$, as lime containing compositions such as suitable filter dust, lime $(Ca(OH)_2)$, or as limestone $(CaCO_3)$. The applicants have further found that the additional oxide or the precursor thereof may be introduced into the liquid molten slag, before it is solidified. The advantage of this introduction into the liquid is that the additional oxide or the precursor thereof may be intimately mixed with the slag according to the present invention.

The technique of plasma treatment of materials is known in the art. WO 2011/136727 A1 discloses a method for the plasma treatment of a waste material which is flowable at room temperature, such as liquids and slurries, and in particular evaporator concentrate from nuclear power plants. The purpose of the treatment is to minimize the volume of the so treated waste. An oxidizing gas is supplied into a plasma generator, and the strongly heated high enthalpy plasma gas is then mixed with the waste material in a mixing zone. The starting material comprises about 15% organic and inorganic material and about 25% salts. In the treatment, the water is volatilized, the organic components are totally decomposed and partially combusted, and the inorganic materials are melted and oxidized. After the mixing zone, a separator is provided in which liquid inorganic materials are separated from the gas stream. The obtained glass matrix/slag product comprises metals and oxides, and is preferably bound in a leach-proof silicate slag and suitable slag forming materials such as crushed glass, sand/quarts, etc. may be added to the mixing zone or the flowable waste so as to improve the formation of leach-proof glass matrix/slag. The glass/slag may then be transported to final storage possibly without any further treatment.

Also WO 2014/046593, already discussed above, describes the use of a plasma torch to produce a hot gas having a temperature of above 3000° C. or even above 4000° C., for treating slag. GB 2448556 and GB 2445420 disclose a plasma process for the vitrification of nuclear waste.

Example 1: Slag Production by Plasma Fuming

Pilot tests were performed on a 3 metric ton scale, demonstrating that the second slag may be produced from the first slag, using a submerged plasma system.

The trials were conducted at the facilities of Scanarc Plasma Technologies. The reactor was powered by a 1 MW plasma torch submerged under the liquid slag level. Fuming of the slag was performed by injecting natural gas though the torch and/or pet coke through a feeding hole on top of the reactor. The slag composition was monitored at regular intervals, by sampling through a sampling hole. The slag composition evolved over time as shown in Table 1, wherein the data are expressed in % wt relative to the total slag composition.

TABLE 1

| | Sample time (min) | | | |
| --- | --- | --- | --- | --- |
| | 15 | 104 | 151 | 207 |
| Fe | 40.0 | 40.9 | 41.2 | 40.5 |
| $SiO_2$ | 28.2 | 30.2 | 30.6 | 31.9 |
| Zn | 7.5 | 4.1 | 2.7 | 0.7 |
| Pb | 0.25 | 0.064 | 0.029 | 0.024 |

The final slag was more comprehensively analysed and further showed the concentrations as shown in Table 2.

TABLE 2

| Component | Wt % |
| --- | --- |
| CaO | 3.0 |
| FeO | 52.1 |
| $Na_2O$ | 2.7 |
| $Al_2O_3$ | 9.0 |
| ZnO | 0.9 |
| PbO | 0.026 |

The final slag was quickly cooled by granulation in cold water, resulting in an amorphous content of 72% wt as determined by XRD. Part of the same slag was slowly cooled by pouring it over a metal plate, resulting in an amorphous content of 44% wt as determined by XRD. The XRD technique used was Quantitative X-ray Diffraction Analysis using Topas Academic Software V5, used $Al_2O_3$ as internal standard.

The Zn content of the slag clearly reduced during the plasma treatment. Also the Pb content further reduced during the treatment. After about 200 minutes, a Zn content below 1% and a Pb content below 0.03% wt was reached.

Example 2: Production of Tiles from the Slag

A pressed inorganic polymer sample was produced using quickly cooled slag from Example 1 as the binder, and using slowly cooled slag from Example 1 as the aggregate. For the binder, a part of the slag was finely ground, and the resulting slag powder had a particle size distribution wherein 90% wt of the particles had a particle diameter in the range of 50 to 70 μm. The slag was milled in a centrifugal mill (Retsch ZM100) using a sieve opening of 80 μm. Particle size distribution (PSD) was measured using wet laser scattering analysis (Malvern Mastersizer S) and was found to have a d90≤70 μm. As aggregate, another part of the slag was ground and from the result by sieving and remixing a mixture was produced having a particle size distribution which corresponded closely to this of Normsand or Norm Sand according to industry standard EN 196-1. To achieve a particle size of slag aggregate comparable to CEN Norm sand (EN 196-1), the slowly cooled slag was milled gradually in a disc mill (Retsch® DM 200). Then, the crushed particles were divided into fractions of 0.08 mm-0.16 mm, 0.16 mm-0.5 mm, 0.5 mm-1 mm, 1 mm-1.6 mm and 1.6 mm-2 mm. This was done by using a column of sieves (Retsch® type) of mesh sizes aforementioned on a vibratory sieve shaker (Retsch® AS 200 basic). Batches of slag aggregate of desired quantities of individual fractions were produced by mixing the obtained fractions in the percentages as specified in EN 196-1. Further used was an activating solution produced by mixing in a 50/50 wt/wt ratio of commercial waterglass ($Na_2SiO_3$) obtained from the company abcr GmbH, Karlsruhe (DE), as Sodium Silicate, water glass, 39-40% silicates in water, with a 6N (6 mole/litre) solution of NaOH in water. The following mixing ratios were applied:

Activating solution/binder: 0.48/1.0
Aggregate/binder: 4.7/1.0

For producing the inorganic polymer sample, first the binder was added slowly to the activating solution under stirring and the result was mixed for a further 30 second period. Then, the aggregate was added slowly during about 1 minute of time, while the mixing was kept running. Afterwards, the mixing continued further for a total duration of 3 minutes. An automatic mixer (Dispermat AE) was used at a constant mixing speed of 600 rpm.

The resulting dry mixture was pressed using a hydraulic laboratory press (MIGNON SSN/EA) at ~75 MPa pressing force for about 15 seconds in a 50×50×27 mm3 (length× width×height) mould. The final product dimensions were 50×50×22 mm3 (length×width×height). The thus pressed tiles were cured first during 24 hours at a temperature of 180° C. in a high pressure autoclave at approximately 10 bar gauge pressure, and followed by a period of 27 days in a controlled air environment at a temperature of 20° C. and 90% relative humidity.

Example 3: Performance Testing of the Tiles

The tiles from Example 2 gave the following results during performance testing.

Compressive strength was measured in the direction of the highest sample's dimension, by means of a Schenck-RM100 compression testing machine (1 mm/min pressing speed). Four samples were tested. The compressive strength at 28 days was found to be 102.4±4.4 MPa. It was found that this compressive strength was already achieved after the $1^{st}$ curing day. The compressive strength remained the same after the additional 27 day curing period.

For comparison, a similar tile was produced using Norm sand obtained from Normensand GmbH, Germany, as the aggregate. Slag aggregate replacement by Normsand was done on an equal volume basis, to keep the same dimensions. The Normsand-based tile achieved a compressive strength of only 35±1 MPa.

Water absorption of the slag-based tiles was measured, according to ISO 10545-3:1995, and was found to be about 4.8% wt. After the full 28 days of curing, no efflorescence could be observed by visual inspection of the tiles.

Having now fully described this invention, it will be appreciated by those skilled in the art that the invention can be performed within a wide range of parameters within what is claimed, without departing from the scope of the invention, as defined by the claims.

The invention claimed is:

1. A slag comprising, on a dry basis and whereby the presence of a metal is expressed as the total of the metal present as elemental metal and the presence of the metal in an oxidized state,
   a) at least 20% wt and at most 49% wt of iron, Fe, in its oxide form,
   b) at most 1.3% wt of copper, Cu,
   c) at least 24% wt and at most 44% wt of silicon dioxide, $SiO_2$, and
   d) at least 2.0% wt and at most 20% wt of calcium oxide, CaO, characterized in that the slag comprises, on the same basis,
   e) at least 0.10% wt and at most 1.00% wt of zinc, Zn,
   f) at least 0.10% wt and at most 2.5% wt of magnesium oxide, MgO,
   g) at least 4.0% wt and at most 12% wt of aluminium oxide, $Al_2O_3$,
   h) at least 0.005% wt and at most 0.100% wt of lead, Pb, and
   i) at least 1.00% wt of sodium oxide, $Na_2O$.

2. The slag according to claim 1, further comprising, on the same basis, at least 20% wt and at most 63% wt of iron oxide, FeO.

3. The slag according to claim 1, further comprising, on the same basis, at most 5% wt of sodium oxide, $Na_2O$.

4. The slag according to claim 1, further comprising, on the same basis, at most 11.5% wt of aluminium oxide, $Al_2O_3$.

5. The slag according to claim 1 comprising, on the same basis, at most 1.20% wt of zinc oxide, ZnO.

6. The slag according to claim 1 comprising, on a dry basis, at most 0.100% wt of lead oxide, PbO.

7. The slag according to claim 1 wherein the iron present in the slag is primarily present in the fayalite structure $Fe_2SiO_4$.

8. The slag according to claim 1 having an amorphous content of at least 30% wt, as determined by X-ray diffraction (XRD).

9. The slag according to claim 1 having a granulate form with an average particle diameter (d50, as calculated on a weight basis) of at least 0.5 mm and at most 5.0 mm.

10. The slag according to claim 1 having a powder form comprising particles of which the particles of the powder have an average particle diameter (d50), as determined by wet sieving and therefore an average calculated on a weight basis, of at least 10 μm and at most 500 μm.

11. The slag according to claim 10 wherein at least 90% wt of the particles (d90) have a diameter of at most 200 μm, as determined by wet sieving.

12. The slag according to claim 1 having the form of chunks having an average particle diameter (d50, as calculated on a weight basis) of at least 50 mm and at most 200 mm.

13. An object comprising as an aggregate the slag according to claim 1.

14. The object according to claim 13 which is a construction element.

15. The object according to claim 13 having a foamed structure.

16. A process for the production of a second slag according to claim 1, the process comprising the steps of:
   providing a first slag containing at least one metal selected from zinc, lead, and combinations thereof, introducing the first slag in a fumer,
fuming an amount of at least one metal selected from zinc, lead, and combinations thereof, from the first slag using at least one plasma torch, to obtain a second slag, and removing the second slag from the fumer.

17. The process according to claim 16 wherein the first slag is introduced into the fumer as a liquid.

18. The process according to claim 16 wherein the first slag is heated in the fumer.

19. The process according to claim 16 wherein part of the first slag is melted by the plasma torch.

20. The process according to claim 16 wherein during the fuming the plasma torch is submerged into the molten slag present in the fumer.

21. The process according to claim 16 wherein an oxide selected from CaO, $Al_2O_3$, and combinations thereof, is added to the slag in the fumer.

22. The process according to claim 21 wherein the oxide is added to the slag at a temperature of at least 1000° C.

23. The process according to claim 16 wherein the second slag is cooled down to become a solid.

24. The process according to claim 23 wherein the cooling is performed by contacting the liquid second slag with water.

25. The process according to claim 23 wherein the second slag is cooled at a rate of at least 40 degrees Celsius per second.

26. The process according to claim 23 further comprising the step of grinding the solid second slag.

27. The process according to claim 23 wherein the second slag is cooled at a rate of less than 30 degrees Celsius per second.

28. The process according to claim 23 further comprising the step of adding the second slag as a binder during the production of an object for the construction industry.

29. The process according to claim 28 wherein the object further comprises an aggregate.

30. The process according to claim 29 wherein the aggregate comprises sand and/or a slag,
wherein the slag comprises, on a dry basis and whereby the presence of a metal is expressed as the total of the metal present as elemental metal and the presence of the metal in an oxidized state,
a) at least 7% wt and at most 49% wt of iron, Fe,
b) at most 1.3% wt of copper, Cu,
c) at least 24% wt and at most 44% wt of silicon dioxide, SiO2, and
d) at least 2.0% wt and at most 20% wt of calcium oxide, CaO,
characterized in that the slag comprises, on the same basis,
e) at least 0.10% wt and at most 1.00% wt of zinc, Zn,
f) at least 0.10% wt and at most 2.5% wt of magnesium oxide, MgO,
g) at least 4.0% wt and at most 12% wt of aluminium oxide, $Al_2O_3$, and
h) at most 0.100% wt of lead, Pb.

31. The process according to claim 30 further comprising the adding of an activator during the production of the object.

32. The process according to claim 31 wherein the activator is selected from the group consisting of sodium hydroxide, NaOH, potassium hydroxide, KOH, sodium silicate, $Na_2SiO3$, potassium silicate, $K_2SiO_3$, and combinations thereof.

33. The process according to claim 28 wherein the object for the construction industry is a construction element.

34. The process according to claim 33 wherein the construction element is selected from the list of a tile, a paver, a block, a concrete block, and combinations thereof.

35. The process according to claim 28 wherein the object for the construction industry is having a foamed structure.

36. A method of employing the slag according to claim 1 as an ingredient selected from the list consisting of a filler, a binder, and combinations thereof, in the construction industry.

37. The method according to claim 36, wherein the slag comprises at most 1.50% wt of zinc, Zn, and wherein the slag is used as a binder for aggregates.

38. The method according to claim 37 as a replacement for Portland cement.

39. The method according to claim 36, employing the slag as a binder in an inorganic polymer composition.

40. The method according to claim 39, comprising the step of foaming the inorganic polymer composition.

41. The method according to claim 40 for improving thermal and/or sound insulation.

42. A method of employing the slag according to claim 1 as a foamed tile component as a black colorant.

43. A method of employing the slag according to claim 1, in an end-use selected from providing a wear layer and/or coating for roofing tiles or roofing shingles, as a blasting sand or blasting grit component, as black hard chunks, and as a high density ballast, and for combinations thereof.

44. A method of employing the slag according to claim 1 for an effect selected from for the reduction of the baking temperature of a brick or of a clay brick, for sound insulation, for shielding X-rays, and combinations thereof.

45. The method according to claim 36, of the slag in combination with an additional oxide or a precursor thereof selected from calcium oxide, CaO, aluminium oxide, $Al_2O_3$, calcium hydroxide, $Ca(OH)_2$, calcium carbonate, $CaCO_3$, and calcium sulphate, $CaSO_4$.

* * * * *